United States Patent [19]
Watanabe et al.

[11] Patent Number: 5,770,647
[45] Date of Patent: Jun. 23, 1998

[54] FRICTION SOUND-PREVENTING SURFACE-TREATING AGENT

[75] Inventors: Tetsuro Watanabe, Iwaki; Kimihiro Matsumoto, Kashiwa; Satoru Ichikawa, Yokosuka; Kuniko Matsuya, Yokohama, all of Japan

[73] Assignees: Nissan Motor Co., Ltd., Yokohama; Tokushu Shikiryo Color & Chemicals, Inc., Kashiwa, both of Japan

[21] Appl. No.: 928,584

[22] Filed: Sep. 12, 1997

Related U.S. Application Data

[63] Continuation-in-part of Ser. No. 575,611, Dec. 20, 1995, abandoned.

[30] Foreign Application Priority Data

| Dec. 27, 1994 | [JP] | Japan | ................................. 6-325649 |
| Dec. 27, 1994 | [JP] | Japan | ................................. 6-325650 |
| Jun. 8, 1995 | [JP] | Japan | ................................. 7-141650 |

[51] Int. Cl.$^6$ .............. C08J 3/00; C08K 3/20; C08L 75/00; B32B 5/16

[52] U.S. Cl. ............ 524/507; 428/323; 428/327; 428/332; 428/339; 428/402; 523/200; 523/201; 523/206; 524/520; 524/527; 525/123; 525/129; 525/455

[58] Field of Search .................................. 524/507, 520, 524/527; 525/123, 129, 455; 523/201, 200, 206; 428/323, 327, 332, 339, 402

[56] References Cited

U.S. PATENT DOCUMENTS

| 4,000,218 | 12/1976 | Critchfield et al. | ..................... 524/871 |
| 5,084,510 | 1/1992 | Braden et al. | .......................... 525/129 |

FOREIGN PATENT DOCUMENTS

| 3-143745 | 6/1991 | Japan . |
| 3-143746 | 6/1991 | Japan . |
| 3-217425 | 9/1991 | Japan . |
| 5-156206 | 6/1993 | Japan . |

*Primary Examiner*—Patrick D. Niland
*Attorney, Agent, or Firm*—Foley & Lardner

[57] ABSTRACT

A friction sound-preventing surface-treating agent is composed of an acryl-vinyl chloride based paint resin, and 2–60 wt % of spherical and/or non-spherical polyurethane particles having an average particle diameter of 1–50 μm as a solid component relative to said acryl-vinyl chloride based paint resin.

10 Claims, 1 Drawing Sheet

FIG_1

FIG_2

FRICTION SOUND-PREVENTING SURFACE-TREATING AGENT

This application is a continuation-in-part, of application Ser. No. 08/575,611, filed Dec. 20, 1995, now abandoned.

BACKGROUND OF THE INVENTION

(1) Field of the Invention

The present invention relates to a friction sound-preventing surface-treating agent to be used for interior parts of automobiles, such as instrument panels, door trims, sun visors, etc. Particularly, the invention relates to the friction sound-preventing surface-treating agent to prevent friction sounds which would be generated when interior parts rub each other due to vibration during automobile running.

(2) Related Art Statement

The surfaces of the instrument panels, pillar garnishes, door trims and sun visors are conventionally covered with a surface skin material such as polyvinyl chloride, which is further surface-treated by coating the surfaces with a acryl-vinyl chloride paint or polyurethane paint in a thickness of 10–30 $\mu$m so as to impart weather resistance upon the surface or reduce the luster of the surfaces.

The surface-treating layer for the instrument panel has a two-layer coating structure of a color coat and a clear coat so as to prevent change in color of the sheet. However, in order to simplify the surface-treating process, such a two-layer coating structure has been recently replaced by a single coating structure of a color coating.

Friction sound is generated between automobile interior parts including the above constituent parts due to vibration during automobile running at places where the interior parts contact one another. Formerly, an unwoven fabric is stuck to these contacting portions against the above frictional sound. The generation of sound is suppressed by interposing the unwoven fabric between the two parts.

However, since it is a fine work to conventionally stick the unwoven fabric to the surface of the interior parts and it is difficult to mechanize this work, there are drawbacks that the number of works becomes larger and the working is costy because of relying upon manual labor.

Further, the appearance causes no quality problem at a contact between an end of the door trim and the instrument side or a seat side because a person cannot see the contact, if the door is closed. However, since he can see the unwoven fabric if the door is opened, the appearance is unfavorably deteriorated if the unwoven fabric is stuck.

On the other hand, Japanese patent application Laid-open Nos. 3-143,745, 3-143,746 and 3-217,425 disclose the technique that the surfaces of the interior parts of the automobile are coated, at the surfaces of the automobile interior parts at the contact portion, with an elastic coating film or a friction sound-preventing agent such as a foreign sound-preventing paint instead of the unwoven fabric.

However, in the above technique, the surfaces of the interior parts are coated with the friction sound-preventing agent at the surface contact portion thereof after the interior parts are molded and assembled at a portion where sound is generated. Although such a technique can be automated, it unfavorably requires an additional coating step. Since this technique is aimed at preventing only the friction sound, it has the drawback that appearance is deteriorated and this technique cannot be applied to a portion where a person can well see.

Further, with respect to the instrument panel, color removal or color migration of a colored paint due to friction or abrasion comes to a problem since the coating has been recently effected in a single layer. This problem is generally solved by making the coated film harder and thus enhancing its abrasion resistance. However, since this tends to deteriorate the friction sound-preventing performance, the friction sound-preventing performance and the reduction in the color migration are in a trade-off relationship.

Japanese patent application Laid-open No. 5-156206 discloses a coating agent containing fine particles of polyurethane in a polyurethane resin.

However, as compared with the acryl based paint, this polyurethane based paint is more costy, and has an inferior effect in suppressing a single sound to be generated which parts contacting each other make when they begin to slide each other.

SUMMARY OF THE INVENTION

Under the circumstances, having noted the conventional problems mentioned above, the present invention is to provide a friction sound-preventing agent which can prevent friction sound to be generated at a surface contact portion between interior parts of an automobile and which can simplify the steps in the conventional process in which an unwoven fabric is stuck to the surface contact portion of the interior parts, by omitting the step of sticking the unwoven fabric thereto.

The present inventors had made strenuous studies to solve the above problems, and as a result they reached the present invention through the discovery that when a given amount of specific particles of polyurethane is incorporated into the acryl-vinyl chloride paint resin, the friction sound to be generated when the interior parts rub each other due to vibration during automobile running can be effectively prevented.

Further, the inventors confirmed that the above friction sound-preventing effect can be also realized in the case that a pigment is incorporated into the paint resin. With respect to the color migration due to friction, the inventors discovered that the color migration due to friction can be reduced by specifying the content of the acryl resin in the paint film at a given value and incorporating a given amount of given polyethylene particles into the friction sound-preventing surface treating agent.

The above object of the present invention can be accomplished by incorporating 2–60 wt. % of spherical and/or non-spherical polyurethane particles having an average particle diameter of 1–50 $\mu$m as a solid component into the acryl-vinyl chloride based paint resin.

The following are preferred embodiments of the present invention.

(1) The friction sound-preventing surface-treating agent comprises said acryl-vinyl chloride based paint resin, (a) 5–60 wt. % of spherical polyurethane particles having an average particle diameter of 5–50 $\mu$m and (b) 1–50 wt. % of resinous and/or rubbery fine particles having an average particle diameter of 1–8 $\mu$m relative to said acryl-vinyl chloride based paint resin, said (a) and (b) being totally contained in an amount of 5–70 wt. % as the solid component.

(2) The friction sound-preventing surface-treating agent comprises in combination said acryl-vinyl chloride based paint resin, (c) 1–50 wt. % of said spherical and/or non-spherical polyurethane particles having the average particle diameter of 1–8 μm as the solid component and (d) 1–40 wt. % of the spherical and/or non-spherical polyurethane particles having the average particle diameter of 5–50 μm as the solid component relative to said acryl-vinyl chloride based paint resin, said (c) and (d) being contained in a total amount of 2–60 wt. %.

(3) Silica particles having an average particle diameter of 1–8 μm are contained as a flatting agent in an amount of 1 . 15 wt. % relative to said acryl-vinyl chloride based paint resin.

(4) Said (b) component is at least one selected from the group consisting of flaky fluoride resin particles, amorphous NBR rubber particles and amorphous SBR rubber particles.

(5) In the case of the colored paint resin, the color migration due to friction can be prevented by incorporating, as a solid component, 2–6 wt. % of spherical particles of the polyethylene wax having the number average molecular weight of 4000 to 20000 relative to 100 wt. % of the paint resin.

(6) The friction sound-preventing surface-treating agent comprises an acryl-vinyl chloride based colored paint resin, spherical polyurethane particles added as a solid component and having a volume average particle diameter of 1 to 50 μm, and a polyethylene wax added as a solid component and having a weight average molecular weight of 4000 to 20000, where the acrylic vinyl chloride based colored paint resin contains 40 to 60 wt. % of an acrylic polymer, and the spherical polyurethane particles and the polyethylene wax are present in an amount of 2 to 70 wt. % and in an amount of 2 to 6 wt. %, respectively, relative to 100% by weight of the acryl-vinyl chloride based colored paint.

(7) The friction sound-preventing surface-treating agent according to (6) further includes 1 to 15 wt. % of silica particles having a volume average particle diameter of 1 to 8 μm, and are present as a delustering agent in an amount of 1 to 15 wt. % relative to 100% by weight of the acryl-vinyl chloride based colored paint.

(8) The friction sound-preventing surface-treating agent according to (6) or (7) has the polyurethane particles comprised of 1 to 50 wt. % of first spherical polyurethane particles having a volume average particle diameter of 1 to 8 μm, and 1 to 40 wt. % of second spherical polyurethane particles having a volume average particle diameter of 5 to 50 μm both relative to 100% by weight of the acryl-vinyl chloride based colored pigment, where the volume average particle diameter of the first polyurethane particles differs from that of the second polyurethane particles by not less than 4 μm. Preferably, the combined amount of the first and second particles is 20 to 70% by weight.

The way of suppressing the friction sound according to the present invention will be explained.

The sound generated inside the compartment of the automobile is broadly classified into two kinds. One is a single sound generated when the parts begin to slide relative to each other, and the other is a continuous sound generated by steady vibration during when the automobile runs. The former single sound is generated if the interior parts receive shock at the time when the automobile starts or runs over a step. On the other hand, the latter continuous sound is continuously and frequently generated during the automobile running depending upon the condition of the roads.

The present invention has been accomplished to reduce the latter continuous sound to be generated by the steady vibration with due consideration of the frequency of the sound and the uncomfortable feeling of the passenger.

Further, as mentioned above, the single sound to be generated when the interior parts begin to slide relative to each other can be reduced by employing the acryl-vinyl chloride based paint as a base paint.

Figure 1:
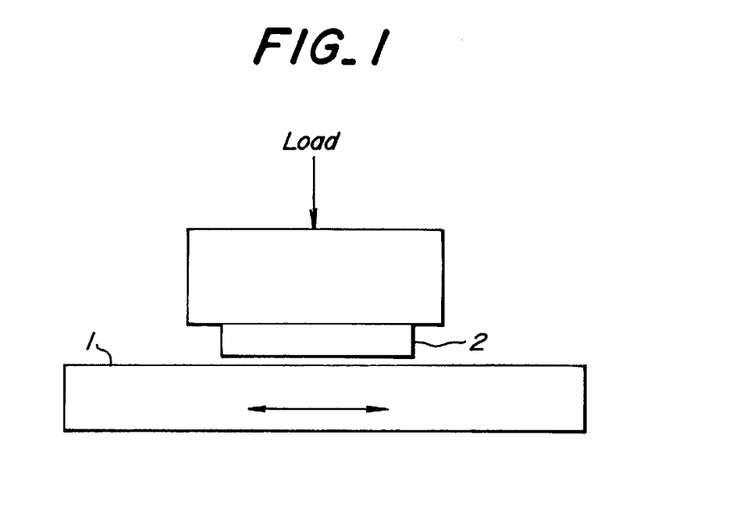
FIG. 1 is a view for illustrating the outline of the reciprocating type friction test used in Test Examples.
Figure 2:
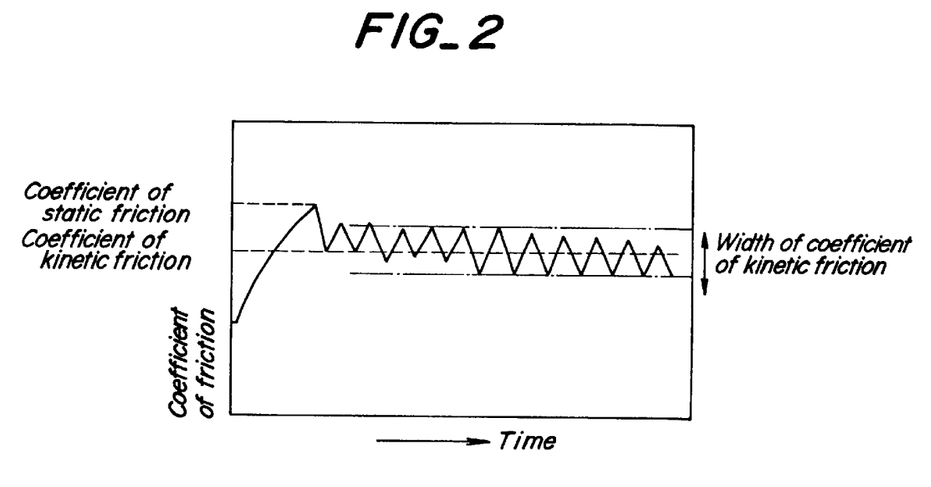
FIG. 2 is a diagram showing the change in the coefficient of friction with the lapse of time as observed in Friction tests shown in FIG. 1.

In FIG. 1 is shown an outline of a reciprocating type friction test effected in Test Example. As shown in FIG. 2, when a test piece 2 was slid on a test piece 1, the coefficient of friction between the two test pieces generally varies with the lapse of time.

The single sound is effectively reduced by making a difference between the coefficient of kinetic friction and the coefficient of static friction smaller. On the other hand, reduction in the variation width of the coefficient of kinetic friction ($\mu$d) is more effective in order to reduce the sound to be generated by the continuous and fine vibration.

Meanwhile, examination has been made from the standpoint of the friction sound with respect to the acryl-vinyl chloride based paint conventionally coated upon the interior parts of the automobile so as to reduce the luster. As a result, it was made clear that silica particles ordinarily used as a flatting agent for the paint deteriorate the friction characteristic.

For this reason, the present inventors added fine particles other than silica into the acryl-vinyl chloride paint and measured the width of the coefficient of kinetic friction. As a result, they found out that the width of the coefficient of kinetic friction can be made smaller by incorporating 2–60 wt. % of the spherical and/or particles of polyurethane having 2–60 wt. % as a solid component into the acryl-vinyl chloride paint resin, so that the friction sound can be prevented.

(1) The above object is more preferably accomplished by incorporating (a) 5–60 wt. % of spherical polyurethane particles having the average particle diameter of 5–50 μm and (b) 1–50 wt. % of resinous and/or rubbery fine particles having the average particle diameter of 1–8 μm into the acryl-vinyl chloride based paint resin, said (a) and (b) being totally contained in an amount of 5–70 wt. % as the solid component.

(2) The friction sound-preventing surface-treating agent comprises in combination (c) said acryl-vinyl chloride based paint resin, 1–50 wt. % of said spherical and/or non-spherical polyurethane particles having the average particle diameter of 1–8 μm as the solid component and (d) 1–40 wt. % of the spherical and/or non-spherical polyurethane particles having the average particle diameter of 5–50 μm as the solid component relative to said acryl-vinyl chloride based paint resin, difference in the average particle diameter between the two kinds of the polyurethane particles being not less than 4 μm said (c) and (d) being contained in a total amount of 2–60 wt. %.

(3) The friction sound-preventing surface-treating agent in which silica particles having an average particle diameter of 1–8 μm are contained as a flatting agent in an amount of –15 wt. % relative to said acryl-vinyl chloride based paint resin.

(4) The friction sound-preventing surface-treating agent in which said (b) component is at least one selected from the group consisting of flaky fluoride resin particles, amorphous NBR rubber particles and amorphous SBR rubber particles.

These and other objects, features and effects of the present invention will be appreciated upon reading the following description of the invention when taken in conjunction with the attached drawing, with the understanding that some modifications, variations and changes of the same could be made by the skilled person in the art to which the invention pertains.

BRIEF DESCRIPTION OF THE DRAWINGS

For a better understanding of the invention, reference is made to the attached drawing, wherein.

DETAILED DESCRIPTION OF THE INVENTION

In the following, the present invention will be explained in more detail.

In the present invention, the average particle diameter of the polyurethane particles is in a range of 1–50 $\mu$m, preferably in a range of 5–30 $\mu$m. If the average particle diameter is less than 1 $\mu$m, the polyurethane particles get into the paint film to diminish the unevenness of the surface of the paint film, so that the flatting effect disappears or the friction characteristic is deteriorated. To the contrary, if the average particle diameter is more than 50 $\mu$m, the thickness of the surface treating agent is around 30 $\mu$m to deteriorate the wear resistance.

In order to exhibit the effects aimed at by the present invention, it is necessary that the shape of the polyurethane particles is spherical and/or non-spherical. Particularly, the shape of the polyurethane particles is spherical and/or non-spherical.

The content of the polyurethane particles as the solid component is in a range of 2–60 wt. %, particularly preferably in a range of 10–60 wt. %. If the content is less than 2 wt. %, the effect of preventing the creaking or squeaking sound is insufficient, and the flatting effect disappears (The term "creaking or squeaking sound" includes all sounds generated when opponents members rub against one another). To the contrary, if the content of the polyurethane particles exceeds 60 wt. %, it becomes impossible to form the coated film, the wear resistance of the coated film decreases and the production cost becomes higher.

Further, in the friction sound-preventing surface-treating agent of the present invention, it is preferable to incorporate (a) 5–60 wt. % of spherical polyurethane particles having the average particle diameter of 5–50 $\mu$m and (b) 1–50 wt. % of resinous and/or rubbery fine particles having the average particle diameter of 1–8 $\mu$m into the acryl-vinyl chloride based paint resin, said (a) and (b) being totally contained in an amount of 5–70 wt. %, preferably in a range of 10–70 wt. % as the solid component.

If the total content of the (a) and (b) is less than 5 wt. %, the creaking or squeaking sound-preventing effect is insufficient and the flatting effect disappears. On the other hand, if the total content is more than 70 wt. %, it becomes impossible to form a coated film, the wear resistance of the coated film decreases, and the production cost becomes higher. If the total content is in the range of 5–60 wt. %, the friction sound-preventing effect can be recognized. The total content may be adjusted within this range depending upon the desired flatting degree.

Neither friction sound-preventing effect nor flatting effect cannot be obtained even if the resinous and/or rubbery fine particles having the average particle diameter of 1–8 $\mu$m is added alone. On the other hand, if these resinous and/or rubbery fine particles are used in combination with the spherical polyurethane particles having the average particle diameter of 5–50 $\mu$m, the flatting effect can be exhibited.

In such a case, different from the flattering agents such as silica ordinarily used, the above resinous and/or rubbery fine particles do not deteriorate the friction sound-preventing performance.

In the present invention, it is preferable to combine the polyurethane particles having different average particle diameters if uneven color or luster of the surface needs to be adjusted. Further, it is preferable to add silica particles having the average particle diameter of 1–8 $\mu$m is added in an amount of 1–15 wt. %.

When two kinds of the polyurethane particles are combined, (c) 1–50 wt. % of the spherical and/or non-spherical polyurethane particles having the average particle diameter of 1–8 $\mu$m as the solid component and (d) 1–40 wt. % of the spherical and/or non-spherical polyurethane particles having the average particle diameter of 5–50 $\mu$m as the solid component relative to said acryl-vinyl chloride based paint resin are employed together, difference in the average particle diameter between the two kinds of the polyurethane particles being not less than 4 $\mu$m and said (c) and (d) being contained in a total amount of 2–60 wt. %.

As the acryl-vinyl chloride based paint resin as the main component, a paint resin (for example, clear coat, color coat) currently used for vehicle interior parts can be employed, and such a paint resin can be prepared according to a conventional technique. The term "acryl-vinyl chloride based paint resin" is defined herein as a blend of an acrylic polymer and a polyvinyl chloride polymer, and the term "acryl" refers to acrylic polymers including acrylate polymers.

For example, the acryl-vinyl chloride based paint resins as shown in Rohm and Haas Company's catalogue "POLYMERS, RESINS AND MONOMERS" (1983) (incorporated herein by reference in its entirety), and the combinations of the PVCs and acrylic resins shown in the following Table may be used as the acryl-vinyl chloride based paint resins as the main component of the friction sound-preventing surface-treating agent according to the present invention.

TABLE 1a

|  | PVC | Acrylic Resin |
|---|---|---|
| F-8144 | SHINETSU PVC MA-800 F | TAKAMATSU YUSHI CROWN RUBBER ABH |
| F-5055 | CHISSO NIPOLIT MH | TAKAMATSU YUSHI CROWN RUBBER ABH |
| FT-48 | CHISSO NIPOLIT MH | TAKAMATSU YUSHI CROWN COAT ESL |
| FD-ink | NISSHIN KAGAKU SOL CH | TAKAMATSU YUSHI CROWN RUBBER MBSL |

TABLE 1a-continued

| PVC | | Acrylic Resin |
|---|---|---|
| | | DR-2, MITSUBISHI RAYON DIANAL BR-85 |
| F-8004 | SHINETSU PVC MA-800 F | — |
| G-37 | CHISSO NIPOLIT MH | MITSUBISHI RAYON DIANAL BR-85, BR-64 |
| F-3928 | SHINETSU PVC MA-800 F | TAKAMATSU YUSHI CROWN COAT ESL |
| FT-67 | SHINETSU PVC MA-800 F | TAKAMATSU YUSHI CROWN COAT ESL |
| KF-9460 | CHISSO NIPOLIT MH | TAKAMATSU YUSHI CROWN COAT ESL |
| G-160S | CHISSO NIPOLIT MH | MITSUBISHI RAYON DIANAL BR-85 |
| | | TAKAMATSU YUSHI CROWN RUBBER ABH |
| F-7615 | SHINETSU PVC MA-800 F | MITSUBISHI RAYON DIANAL BR-85 |
| | | TAKAMATSU YUSHI CROWN RUBBER ABH |
| F-7573 | SHINETSU PVC MA-800 F | MITSUBISHI RAYON DIANAL BR-85 |
| | | TAKAMATSU YUSHI CROWN RUBBER ABH |
| F-7577S | Geon 121 Paste Resin | MITSUBISHI RAYON DIANAL BR-85 |
| F-5601 | CHISSO NIPOLIT MH | MITSUBISHI RAYON DIANAL BR-64 |
| D-2-1 | CHISSO NIPOLIT MH | MITSUBISHI RAYON DIANAL BR-64 |

In Table 1a, SHINETSU PVC MA-800F, etc. are commercial products manufactured as recited below.

SHINETSU PVC MA-800F . . . Shinetsu Polymer Co., Ltd.

CHISSO NIPOLIT MH . . . CHISSO Co., Ltd.

NISSHIN KAGAKU SOL CH . . . NISSHIN KAGAKU Co., Ltd.

Geon 121 Paste Reson . . . Japanese Geon Co., Ltd.

TAKAMATSU YUSHI CROWN RUBBER ABH, COAT ESL, RUBBER MBSL DR-2 . . . Takamatsu Oil & Fat Co., Ltd.

MITSUBISHI RAYON DIANAL BR-85, BR-64 . . . Mitsubishi Rayon Co., Ltd.

The weight ratio between the PVC and acrylic resin may vary widely. For example, a 30:70 to 70:80 ratio may be employed.

The acryl-vinyl chloride based paint resin as one of the components of the friction sound-preventing surface-treating agent according to the present invention, are not limited to the acryl-vinyl chloride based paint conventionally employed to be coated upon the interior parts of the automobiles. Other suitable acrylic PVC combinations may also be used.

As the polyurethane particles, fine polyurethane particles disclosed in JP5-156,206 may be employed in the sound-preventing surface treating agent according to the present invention. JP5-156,206 describes the fine polyurethane particles as crosslinked urethane polymers obtained by subjecting polyisocyanate compounds and various hydroxyl compounds (polyhydric alcohols, polyester polyols, polyethers, polycarbonate polyols, poly-pentadiene polyols, etc.) to urethane reaction.

The present invention is based in part on the inventors' recognition that the polyurethane particles have a smaller Young's modulus (soft) and a lower coefficient of friction as compared with other particles such as acrylic resin particles, silica particles and fluoride resin particles, and that the adjacent polyurethane particles, in that the paint can smoothly displace relative to one another so that sound generated by friction may be more effectively prevented.

For example, polyurethane particles such as Art Pearl (Negami Chemical Industrial Co., Ltd.) may be employed for the present invention. Fine particles having "800 Type (5–7 μm)", "400 Type (12–17) μm", "300 Type (18–24 μm)", "200 Type (30–40 μm)", and "100 Type (60–75 μm) are commercially available. In Examples 1–1 to 1–22 and 2–1 to 2–4 and Comparative Examples 1–1 to 1–18 and 2–1 to 2–8 of the present specification, "400 Type" was used.

The average particle diameter of the fine polyurethane particles and other particles recited throughout the specification, is the average particle diameter at which the accumulated volume amounts to 50 % of the total volume of the particles. This average particle diameter is the same as the weight average particle diameter if the material is the same and its shape (spherical or the like) is the same, because of the same density. More specifically, the volume occupied by the entire fine particles is first measured ($V_o$). All the fine particles are arrayed from the smallest size to the largest size. Then, the volume $V_1$, $V_2$, $V_3$, $V_4$, . . . $V_n$ are measured with respect to the particles arranged from the smallest size to the largest size, respectively. If the total of $V_1+V_2+V_3+\ldots V_n = V_o/2$, the particle diameter corresponding to this $V_n$ is taken as the average particle diameter.

This accumulated volume-based average particle diameter has been very popular and widely employed among such fine particle average particle diameter measurement, and has been introduced into JIS (Japanese Industrial Standard) due to its popularity. See JISR1629 (incorporated herein by reference). As to Art Pearl particles described above, the average particle diameters are based on this accumulated volume-based average particle diameter measurement.

In the case of the colored paint resin, the color migration due to the friction or abrasion can be prevented by incorporating, as a solid component, 2–6 wt. % of spherical particles of the polyethylene wax having the number average molecular weight of 4000 to 20000 relative to 100 wt. % of the paint resin.

For example, the friction sound-preventing surface-treating agent according to the present invention may be prepared by adding, to the acrylvinyl chloride based paint resin, 5–60 wt. % of the spherical polyurethane particles having the average particle diameter of 5 to 50 μm and 1–50 wt. % of the resinous and/or rubbery fine particles having the average particle diameter of 1–8 μm in a total amount of 6–70 wt. % together with various additives (stabilizer, etc.); stirring the mixture; charging the mixture into a dispersing device such as a three-roll mill, a ball mill, a pot mill, a steel mill, a pebble mill, a sand mill or a roll mill; and uniforming mixing and dispersing the mixture.

At that time, it is preferable to add a surface-active agent so as to improve dispersability. Then, the mixed and dispersed mixture is diluted depending upon the coating method.

The thus prepared friction sound-preventing surface-treating agent may be used in the same manner as in the case of the currently employed surface-treating agent with respect to the surface skin material. This currently employed manner means that if a PVC sheet is produced as a surface skin for the interior parts, the surface-treating agent is coated onto the surface of the sheet by air spraying, airless spraying or graver roll. Other parts or sites may be subjected to spray coating, brush coating, roller coating or immersion coating depending upon the shape of portions to be coated or the configuration of the surface.

As parts to be coated with the friction sound-preventing surface-treating agent, mention may be made of surface skins for instrument panels, door trims, pillar garnishes, sun visors, seat lathers, etc. as well as assembly parts such as meter clusters, consol boxes, etc. As the material of such parts to be coated, mention may be made particularly of PVC or TPO as surface skins and various plastics, rubber, metal and glass for other parts or sites.

The function of the present invention will be explained below.

The friction sound to be generated by the steady vibration during the vehicle running can be prevented by adding 2–60 wt. % of the spherical and/or non-spherical polyurethane particles having the average particle diameter of 1–50 $\mu$m as the solid component to the currently used surface treating agent. This is considered that the addition of the spherical or non-spherical makes it possible to form a gently uneven surface of the paint so that stress concentration is difficult to occur at the contact surface and the surfaces of the opponent parts are difficult to be caught on.

If the uneven surface color or luster needs to be adjusted, at least one selected from the group consisting of flaky fluoride resin particles, 1–50 wt. % of amorphous NBR rubber particles and amorphous SBR rubber particles having the average particle diameter of 1–8 $\mu$m may be incorporated into the surface-treating agent as the resinous and/or rubbery fine particles. Silica particles having an average particle diameter of 1–8 $\mu$m are contained as a flatting agent in an amount of 1–15 wt. % relative to said acryl-vinyl chloride based paint resin.

In the case of the colored paint resin, the color migration due to the friction or abrasion can be prevented by incorporating, as a solid component, 2–6 wt. % of spherical particles of the polyethylene wax having the number average molecular weight of 4000 to 20000 and average particle diameter of 15 $\mu$m relative to 100 wt. % of the paint resin.

Since the coated film layer is formed during the sheet surface-treating step currently employed, no new additional step needs to be introduced, and the conventional unwoven fabric-sticking step can be omitted. Further, since the appearance is not deteriorated because the friction sound-preventing function is imparted upon the surface-treating agent currently used, the surface-treating agent of the present invention can be applied to an area that a person can see. Furthermore, since the coated film layer is formed on the entire sheet, the friction sound to be generated through interaction among the instrument panel, the door trim, the pillar garnish, the sun visor, the seat lather or the like, parts assembled thereto and those interfering with these parts can be reduced.

Examples

In the following, the present invention will be explained in more detail with reference to Examples, but the invention is not limited thereto. In Examples 1–1 to 1–22 and 2–1 to 2–4 and Comparative Examples 1–1 to 1–8 and 2–1 to 2–8 of the present specification, SHINETSU PVC MA-800F was used as the PVC, whereas MITSUBISHI RAYON DIANAL BR-85 was used as the acrylic resin.

Example 1–1

Polyurethane particles (the average particle diameter: 15 $\mu$m, really spherical shape) were added as a solid component in an amount of 40 wt. % to the acryl-vinyl chloride based paint resin (acryl portion: 35 wt. %, vinyl chloride portion:65 wt. %), and the mixture was stirred. Then, after the mixture was mixed and dispersed in a sand grinding mill, the resultant was diluted to 50 wt. % concentration with a diluting agent, thereby preparing a friction sound-preventing surface-treating agent in Example 1.

Example 1–2

A friction sound-preventing surface-treating agent in Example 1–2 was prepared in completely the same manner as in Example 1–1 except that in addition to the polyurethane particles, silica particles (the average particle diameter of 3 $\mu$m, spherical shape) were added in an amount of 30 wt. % to the acryl-vinyl chloride based paint resin.

Example 1–3

A friction sound-preventing surface-treating agent in

Example 1–3 was prepared in completely the same manner as in Example 1–1 except that 30 wt. % of polyurethane particles A (the average particle diameter of 15 $\mu$m, really spherical shape), and 30 wt. % of polyurethane particles B (the average particle diameter of 5 $\mu$m , spherical shape) were added to the acryl-vinyl chloride based paint resin.

Example 1–4

A friction sound-preventing surface-treating agent in Example 1–4 was prepared in completely the same manner as in Example 1–1 except that 25 wt. % of polyurethane particles A (the average particle diameter of 15 $\mu$m, really spherical shape), 25 wt. % of polyurethane particles B (the average particle diameter of 5 $\mu$m, spherical shape) and further 7 wt. % of silica particles (average particle diameter: 3 $\mu$m) were added to the acryl-vinyl chloride based paint resin.

Example 1–5

A friction sound-preventing surface-treating agent in Example 1–5 was prepared in completely the same manner as in Example 1–1 except that 40 wt. % of polyurethane particles (the average particle diameter of 15 $\mu$m, really spherical shape) were added to the acryl-vinyl chloride based paint resin.

Comparative Example 1–1

A friction sound-preventing surface-treating agent in Comparative Example 1–1 was prepared in completely the same manner as in Example 1–1 except that no polyurethane particles were added.

Comparative Example 1–2

A friction sound-preventing surface-treating agent in Comparative Example 1–2 was prepared in completely the same manner as in Example 1–1 except that 60 wt. % of silica particles (the average particle diameter: 5.0 $\mu$m, really spherical shape) were added in place of the polyurethane particles.

Comparative Example 1–3

A friction sound-preventing surface-treating agent in Comparative Example 1–3 was prepared in completely the same manner as in Example 1–1 except that 60 wt. % of acryl resin particles (the average particle diameter: 5.0 μm, really spherical shape) were added in place of the polyurethane particles.

Comparative Example 1–4

A friction sound-preventing surface-treating agent in Comparative Example 4 was prepared in completely the same manner as in Example 1–1 except that 60 wt. % of nylon resin particles (the average particle diameter: 10 μm, amorphous shape) were added in place of the polyurethane particles.

Comparative Example 1–5

A friction sound-preventing surface-treating agent in Comparative Example 1–5 was prepared in completely the same manner as in Example 1–1 except that 60 wt. % of fluoride resin particles (the average particle diameter: 10 μm, non-spherical shape) were added in place of the polyurethane particles.

Comparative Example 1–6

A friction sound-preventing surface-treating agent in Comparative Example 1'6 was prepared in completely the same manner as in Example 1–1 except that 60 wt. % of polyurethane particles (the average particle diameter: 3 μm, amorphous shape) were added to the acryl-vinyl chloride based paint resin.

Comparative Example 1–7

A friction sound-preventing surface-treating agent in Comparative Example 1–7 was prepared in completely the same manner as in Example 1–1 except that 60 wt. % of polyurethane particles (the average particle diameter: 60 μm, spherical shape) were added to the acryl-vinyl chloride based paint resin.

Comparative Example 1–8

A conventionally used unwoven fabric was used as Comparative Example 1–8.

Test Results

In order to compare the friction sound-preventing effects in the case of the surface-treating agents obtained in respective Examples 1–1 to 1–5 and Comparative Examples 1–1 to 1–8, test sheets were prepared by coating each surface-treating agent upon a currently used PVC sheet with no surface treatment and curing the coated film. An ordinary PVC sheet for automobile interior use was employed as an opponent material to the thus obtained sheet, and friction tests were effected through reciprocating to evaluate the friction characteristic and confirm generation of the friction sound. Further, the luster of the coated surface at 60° C. was measured by using a gloss meter. Results are shown in Table 1.

TABLE 1

| | Added particles | | | Evaluated results | | | |
| --- | --- | --- | --- | --- | --- | --- | --- |
| | Kind | Average particle diameter μm | Solid component wt % | Coefficient of kinetic friction μd | Sound generation *) | Luster degree 60° | Remarks |
| Example 1-1 | polyurethane | 15 | 40 | 0.25 | o | 2.84 | really spherical |
| Example 1-2 | polyurethane | 15 | 40 | 0.23 | o | 1.30 | really spherical |
| | silica | 3 | 30 | | | | spherical |
| Example 1-3 | polyurethane A | 15 | 30 | 0.22 | o | 1.68 | really spherical |
| | polyurethane B | 5 | 30 | | | | spherical |
| Example 1-4 | polyurethane A | 15 | 25 | | | | really spheri.cal |
| | polyurethane B | 5 | 25 | 0.33 | o | 2.06 | spherical |
| | silica | 5 | 7 | | | | really spherical |
| Example 1-5 | polyurethane | 15 | 40 | 0.25 | o | 1.50 | really spherical |
| Comparative Example 1-1 | — | — | — | 0.22 | o | 33.6 | paint alone |
| Comparative Example 1-2 | silica | 5 | 60 | 0.52 | x | 1.10 | really spherical |
| Comparative Example 1-3 | acryl resin | 5 | 60 | 0.48 | x | 2.22 | really spherical |
| Comparative Example 1-4 | nylon resin | 10 | 60 | 0.48 | x | 1.13 | amorphous |
| Comparative Example 1-5 | fluoride resin | 10 | 60 | 0.41 | x | 8.03 | massy |
| Comparative Example 1-6 | polyurethane | 3 | 60 | 0.48 | x | 1.45 | amorphous |
| Comparative Example 1-7 | polyurethane | 60 | 60 | — | x | — | spherical |
| Comparative Example 1-8 | unwoven cloth | — | — | 0.20 | o | — | conventional |

*) o . . . sound generated
x . . . no sound generated

As shown in Table 1, it was confirmed that the paints obtained in Examples generated no sound, and the width of the coefficient of kinetic friction thereof was small, compatible to that in the case of the unwoven fabric used currently against the friction sound, and that the paints in Examples exhibited the friction sound-preventing effect.

To the contrary, the paint obtained in Comparative Example 1–1 was effective against the friction sound, but its commercial value is inferior because it did not afford the flatting effect. In Comparative Examples 1–2 to 1–4 and 1–6, the flatting effect was imparted, but the width of the coefficient of kinetic friction was large to generate friction sound. In Comparative Example 1–5, the flatting degree is small.

Example 1–6

To 100 wt. % of the acryl-vinyl chloride based paint resin (acryl portion: 35 wt. %, vinyl chloride portion: 65 wt. %) were added 20 wt. % of polyurethane particles (the average particle diameter: 15 μm, really spherical shape) as a solid component and 40 wt. % of frozen and crushed particles of commercially available NBR rubber (the average particle diameter: 5 μm) as a solid component, and the resultant was stirred. Then, after the mixture was mixed and dispersed in a sand grinding mill, the mixture was diluted at a rate of 100:200 with a mixed diluting agent of toluene, xylene and MEK, thereby preparing a friction sound-preventing surface-treating agent in Example 6.

Example 1–7

A friction sound-preventing surface-treating agent in Example 1–7 was prepared in completely the same manner as in Example 1–6 except that frozen and crushed particles of commercially available SBR rubber (the average particle diameter: 5 μm) were used in place of the frozen and crushed particles of commercially available NBR rubber (the average particle diameter: 5 μm).

Example 1–8

A friction sound-preventing surface-treating agent in Example 1–8 was prepared in completely the same manner as in Example 1–6 except that commercially available flaky fine particles (the average particle diameter: 5 μm) were used in place of the frozen and crushed particles of commercially available NBR rubber (the average particle diameter: 5 μm).

Example 1–9

A friction sound-preventing surface-treating agent in Example 1–9 was prepared in completely the same manner as in Example 1–6 except that 40 wt. % of the polyurethane particles (the average particle diameter: 15 μm, really spherical shape) as a solid component and 10 wt. % of the frozen and crushed particles of commercially available NBR rubber (the average particle diameter: 5 μm) as a solid component were added to 100 wt. % of the acryl-vinyl chloride based paint resin (acryl portion: 35 wt. %, vinyl chloride portion: 65 wt. %).

Example 1–10

A friction sound-preventing surface-treating agent in Example 1–10 was prepared in completely the same manner as in Example 1–9 except that the frozen and crushed particles of commercially available SBR rubber (the average particle diameter: 5 μm) were used in place of the frozen and crushed particles of commercially available NBR rubber (the average particle diameter: 5 μm).

Example 1–11

A friction sound-preventing surface-treating agent in Example 1–11 was prepared in completely the same manner as in Example 1–9 except that the commercially available flaky fine particles (the average particle diameter: 5 μm) were used in place of the frozen and crushed particles of commercially available NBR rubber (the average particle diameter: 5 μm).

Example 1–12

A friction sound-preventing surface-treating agent in Example 1–12 was prepared in completely the same manner as in Example 1–6 except that 40 wt. % of polyurethane particles (the average particle diameter: 15 μm, really spherical shape) as a solid component, 10 wt. % of frozen and crushed particles of commercially available NBR rubber (the average particle diameter: 5 μm) as a solid component and 11 wt. % of silica particles (the average particle diameter: 3 μm, amorphous shape) as a solid component were added to 100 wt. % of the acryl-vinyl chloride based paint resin (acryl portion: 35 wt. %, vinyl chloride portion: 65 wt. %.

Example 1–13

A friction sound-preventing surface-treating agent in Example 1–13 was prepared in completely the same manner as in Example 1–12 except that frozen and crushed particles of commercially available SBR rubber (the average particle diameter: 5 μm) were used in place of the frozen and crushed particles of commercially available NBR rubber (the average particle diameter: 5 μm).

Example 1–14

A friction sound-preventing surface-treating agent in Example 1–14 was prepared in completely the same manner as in Example 1–12 except that commercially available flaky fine particles of fluoride resin (the average particle diameter: 5 μm) were used in place of the frozen and crushed particles of commercially available NBR rubber (the average particle diameter: 5 μm).

Example 1–15

A friction sound-preventing surface-treating agent in Example 1–15 was prepared in completely the same manner as in Example 1–6 except that 30 wt. % of the polyurethane particles (the average particle diameter: 15 μm, really spherical shape) as a solid component, 10 wt. % of the frozen and crushed particles of commercially available NBR rubber (the average particle diameter: 5 μm) as a solid component and 10 wt. % of the frozen and crushed particles of commercially available SBR rubber (the average particle diameter: 5 μm) as a solid component were added to 100 wt. % of the acryl-vinyl chloride based paint resin (acryl portion: 35 wt. %, vinyl chloride portion: 65 wt. %).

Example 1–16

A friction sound-preventing surface-treating agent in Example 1–16 was prepared in completely the same manner as in Example 1–15 except that the frozen and crushed particles of commercially available flaky fluoride resin particles (the average particle diameter: 5 μm) were used in place of the frozen and crushed particles of commercially available NBR rubber (the average particle diameter: 5 μm).

Example 1–17

A friction sound-preventing surface-treating agent in Example 1–17 was prepared in completely the same manner as in Example 1–15 except that the commercially available flaky fluoride resin fine particles (the average particle diameter: 5 μm) were used in place of the frozen and crushed particles of commercially available SBR rubber (the average particle diameter: 5 μm).

Example 1–18

A friction sound-preventing surface-treating agent in Example 1–18 was prepared in completely the same manner as in Example 1–6 except that 30 wt. % of polyurethane particles (the average particle diameter: 15 m, really spherical shape) as a solid component, 10 wt. % of the frozen and crushed particles of commercially available NBR rubber (the average particle diameter: 5 μm) as a solid component, 10 wt. % of the frozen and crushed particles of commercially available SBR rubber (the average particle diameter: 5 μm) as a solid component, and 7 wt. % of silica particles (the average particle diameter: 3 μm, amorphous shape) as a solid component were added to 100 wt. % of the acryl-vinyl chloride based paint resin (acryl portion: 35 wt. %, vinyl chloride portion: 65 wt. %.

Example 1–19

A friction sound-preventing surface-treating agent in Example 1–19 was prepared in completely the same manner as in Example 1–18 except that the frozen and crushed particles of commercially available flaky fluorine resin particles (the average particle diameter: 5 μm) were used in place of the frozen and crushed particles of commercially available NBR rubber (the average particle diameter: 5 μm).

Example 1–20

A friction sound-preventing surface-treating agent in Example 1–20 was prepared in completely the same manner as in Example 1–18 except that the commercially available flaky fluoride resin fine particles (the average particle diameter: 5 μm) were used in place of the frozen and crushed particles of commercially available SBR rubber (the average particle diameter: 5 μm).

Example 1–21

A friction sound-preventing surface-treating agent in Example 1–21 was prepared in completely the same manner as in Example 1–6 except that 25 wt. % of polyurethane particles (the average particle diameter: 15 μm, really spherical shape) as a solid component, 8 wt. % of the frozen and crushed particles of commercially available NBR rubber (the average particle diameter: 5 μm) as a solid component, 8 wt. % of the frozen and crushed particles of commercially available SBR rubber (the average particle diameter: 5 μm) as a solid component, and 8 wt. % of the commercially available flaky fluoride resin particles (the average particle diameter: 3 μm) as a solid component were added to 100 wt. % of the acryl-vinyl chloride based paint resin (acryl portion: 35 wt. %, vinyl chloride portion: 65 wt. %.

Example 1–22

A friction sound-preventing surface-treating agent in Example 1–22 was prepared in completely the same manner as in Example 1–6 except that 25 wt. % of polyurethane particles (the average particle diameter: 15 μm, really spherical shape) as a solid component, 8 wt. % of the frozen and crushed particles of commercially available NBR rubber (the average particle diameter: 5 μm) as a solid component, 8 wt. % of the frozen and crushed particles of commercially available SBR rubber (the average particle diameter: 5 μm) as a solid component, 8 wt. % of the commercially available flaky fluoride resin particles (the average particle diameter: 3 μm) as a solid component, and 7 wt. % of silica particles dispersed in a "DYNO-MILL®" (the average particle diameter: 3 μm, amorphous) as a solid component were added to 100 wt. % of the acryl-vinyl chloride based paint resin (acryl portion: 35 wt. %, vinyl chloride portion: 65 wt. %.

Comparative Example 1–9

A friction sound-preventing surface-treating agent in Comparative Example 1–9 was prepared in completely the same manner as in Example 1–6 except that neither polyurethane particles nor the frozen and crushed particles of the NBR rubber were added.

Comparative Example 1–10

A friction sound-preventing surface-treating agent in Comparative Example 1–10 was prepared in completely the same manner as in Example 1–6 except that 20 wt. % of silica particles dispersed in a "DYNO-MILL®" (the average particle diameter: 3 μm, amorphous) as a solid component were added to 100 wt. % of the acryl-vinyl chloride based paint resin (acryl portion: 35 wt. %, vinyl chloride portion: 65 wt. % were added.

Comparative Example 1–11

A friction sound-preventing surface-treating agent in Comparative Example 1–11 was prepared in completely the same manner as in Example 1–6 except that 70 wt. % of the polyurethane particles (the average particle diameter: 15 μm, really spherical shape) as a solid component were added to 100 wt. % of the acryl-vinyl chloride based paint resin (acryl portion: 35 wt. %, vinyl chloride portion: 65 wt. % were added.

A test sheet was obtained by applying the thus prepared surface-treating agent upon a currently used PVC sheet with no surface treatment, and subjected to a friction test. However, since the powder dropped during the test, this surface-treating agent could not be practically used.

Comparative Example 1–12

A friction sound-preventing surface-treating agent in Comparative Example 1–12 was prepared in completely the same manner as in Example 6except that 60 wt. % of the polyurethane particles (the average particle diameter: 3 μm, really spherical shape) as a solid component were added to 100 wt. % of the acryl-vinyl chloride based paint resin (acryl portion: 35 wt. %, vinyl chloride portion: 65 wt. % were added.

Comparative Example 1–13

A friction sound-preventing surface-treating agent in Comparative Example 1–13 was prepared in completely the same manner as in Example 1–6 except that 3 wt. % of the polyurethane particles (the average particle diameter: 15 μm, really spherical shape) as a solid component were added to 100 wt. % of the acryl-vinyl chloride based paint resin (acryl portion: 35 wt. %, vinyl chloride portion: 65 wt. % were added.

Comparative Example 1–14

A friction sound-preventing surface-treating agent in Comparative Example 1–14 was prepared in completely the same manner as in Example 1–6 except that 50 wt. % of polyurethane particles (the average particle diameter: 15 μm, amorphous shape) as a solid component, 8 wt. % of the frozen and crushed particles of commercially available NBR rubber (the average particle diameter: 5 μm) as a solid component, 8 wt. % of the frozen and crushed particles of commercially available SBR rubber (the average particle diameter: 5 μm) as a solid component, and 8 wt. % of the commercially available flaky fluoride resin particles (the average particle diameter: 5 μm) as a solid component were added to 100 wt. % of the acryl-vinyl chloride based paint resin (acryl portion: 35 wt. %, vinyl chloride portion: 65 wt. %.

A test sheet was obtained by applying the thus prepared surface-treating agent upon a currently used PVC sheet with no surface treatment, and subjected to a friction test. However, since the powder dropped during the test, this surface-treating agent could not be practically used.

Comparative Example 1–15

A friction sound-preventing surface-treating agent in Comparative Example 1–15 was prepared in completely the same manner as in Example 1–6 except that 40 wt. % of polyurethane particles (the average particle diameter: 15 μm, really spherical shape) as a solid component and 30 wt. % of the frozen and crushed particles of commercially available NBR rubber (the average particle diameter: 5 μm) as a solid component were added to 100 wt. % of the acryl-vinyl chloride based paint resin (acryl portion: 35 wt. %, vinyl chloride portion: 65 wt. %.

A test sheet was obtained by applying the thus prepared surface-treating agent upon a currently used PVC sheet with no surface treatment, and subjected to a friction test. However, since the powder dropped during the test, this surface-treating agent could not be practically used.

Comparative Example 1–16

A friction sound-preventing surface-treating agent in Comparative Example 1–16 was prepared in completely the same manner as in Example 1–6 except that 40 wt. % of polyurethane particles (the average particle diameter: 15 μm, really spherical shape) as a solid component and 30 wt. % of the frozen and crushed particles of commercially available SBR rubber (the average particle diameter: 5 μm) as a solid component were added to 100 wt. % of the acryl-vinyl chloride based paint resin (acryl portion: 35 wt. %, vinyl chloride portion: 65 wt. %).

A test sheet was obtained by applying the thus prepared surface-treating agent upon a currently used PVC sheet with no surface treatment, and subjected to a friction test. However, since the powder dropped during the test, this surface-treating agent could not be practically used.

Comparative Example 1–17

A friction sound-preventing surface-treating agent in Comparative Example 1–17 was prepared in completely the same manner as in Example 6 except that 40 wt. % of polyurethane particles (the average particle diameter: 15 μm, really spherical shape) as a solid component and 30 wt. % of the commercially available flaky fluoride resin particles (the average particle diameter: 5 μm) as a solid component were added to 100 wt. % of the acryl-vinyl chloride based paint resin (acryl portion: 35 wt. %, vinyl chloride portion: 65 wt. %).

A test sheet was obtained by applying the thus prepared surface-treating agent upon a currently used PVC sheet with no surface treatment, and subjected to a friction test. However, since the powder dropped during the test, this surface-treating agent could not be practically used.

Comparative Example 1–18

A friction sound-preventing surface-treating agent in Comparative Example 1–18 was prepared in completely the same manner as in Example 1–6 except that 30 wt. % of polyurethane particles (the average particle diameter: 15 μm, really spherical shape) as a solid component, and 10 wt. % of the frozen and crushed particles of commercially available NBR rubber (the average particle diameter: 5 μm) as a solid component, 10 wt. % of the frozen and crushed particles of commercially available SBR rubber (the average particle diameter: 5 μm) as a solid component, 10 wt. % of the commercially available flaky fluorine resin particles (the average particle diameter: 5 μm) as a solid component, and 20 wt. % of silica particles dispersed in the "DYNO-MILL®" (the average particle diameter: 3 μm, amorphous shape) were added to 100 wt. % of the acryl-vinyl chloride based paint resin (acryl portion: 35 wt. %, vinyl chloride portion: 65 wt. %.

Test Results

In order to compare the friction sound-preventing effects in the case of the surface-treating agents obtained in respective Examples 1–6 to 1–22 and Comparative Examples 1–9 to 1–18, test sheets were prepared by coating each surface-treating agent upon a currently used PVC sheet with no surface treatment and curing the coated film. An ordinary PVC sheet for automobile interior use was employed as an dpponent material to the thus obtained sheet, and friction tests were effected through reciprocating to evaluate the friction characteristic and confirm generation of the friction sound. Further, the luster of the coated surface at 60° C. was measured by using a gloss meter. Results are shown in Table 2.

TABLE 2(a)

| Kind of particles (Average particle diameter) | Addition amount of friction sound-preventing particles (wt %) | | | | | | Luster degree (gloss value at 60° C.) | Evaluated friction sound characteristic | |
|---|---|---|---|---|---|---|---|---|---|
| | Really spherical polyurethane particles (15 μm) | Crushed NBR particles (5 μm) | Crushed SBR particles (5 μm) | Flaky fluoride particles (5 μm) | Total amount of added particles | Silica particles (3 μm) | | μd width | Generation of sound *) |
| Example 1-6 | 20 | 40 | 0 | 0 | 60 | — | 1.21 | 0.26 | ○ |
| Example 1-7 | 20 | 0 | 40 | 0 | 60 | — | 1.18 | 0.26 | ○ |

TABLE 2(a)-continued

| Kind of particles (Average particle diameter) | Addition amount of friction sound-preventing particles (wt %) | | | | | Silica particles (3 μm) | Luster degree (gloss value at 60° C.) | Evaluated friction sound characteristic | |
|---|---|---|---|---|---|---|---|---|---|
| | Really spherical polyurethane particles (15 μm) | Crushed NBR particles (5 μm) | Crushed SBR particles (5 μm) | Flaky fluoride particles (5 μm) | Total amount of added particles | | | μd width | Generation of sound *) |
| Example 1-8  | 20 | 0  | 0  | 40 | 60 | —  | 1.19 | 0.25 | ○ |
| Example 1-9  | 40 | 10 | 0  | 0  | 50 | —  | 1.69 | 0.25 | ○ |
| Example 1-10 | 40 | 0  | 10 | 0  | 50 | —  | 1.68 | 0.26 | ○ |
| Example 1-11 | 40 | 0  | 0  | 10 | 50 | —  | 1.7  | 0.24 | ○ |
| Example 1-12 | 40 | 10 | 0  | 0  | 50 | 11 | 1.14 | 0.27 | ○ |
| Example 1-13 | 40 | 0  | 10 | 0  | 50 | 11 | 1.13 | 0.27 | ○ |
| Example 1-14 | 40 | 0  | 0  | 10 | 50 | 11 | 1.11 | 0.26 | ○ |
| Example 1-15 | 30 | 10 | 10 | 0  | 50 | —  | 1.51 | 0.27 | ○ |
| Example 1-16 | 30 | 0  | 10 | 10 | 50 | —  | 1.48 | 0.28 | ○ |
| Example 1-17 | 30 | 10 | 0  | 10 | 50 | —  | 1.49 | 0.27 | ○ |
| Example 1-18 | 30 | 10 | 10 | 0  | 50 | 7  | 0.98 | 0.28 | ○ |
| Example 1-19 | 30 | 0  | 10 | 10 | 50 | 7  | 0.97 | 0.28 | ○ |
| Example 1-20 | 30 | 10 | 0  | 10 | 50 | 7  | 0.98 | 0.28 | ○ |
| Example 1-21 | 25 | 8  | 8  | 8  | 49 | —  | 0.18 | 0.26 | ○ |
| Example 1-22 | 25 | 8  | 8  | 8  | 49 | 7  | 0.92 | 0.27 | ○ |

TABLE 2(b)

| Kind of particles (Average particle diameter) | Addition amount of friction sound-preventing particles (wt %) | | | | | Silica particles (3 μm) | Luster degree (gloss value at 60° C.) | Evaluated friction sound characteristic | |
|---|---|---|---|---|---|---|---|---|---|
| | Really spherical polyurethane particles (15 μm) | Crushed NBR particles (5 μm) | Crushed SBR particles (5 μm) | Flaky fluoride particles (5 μm) | Total amount of added particles | | | μd width | Generation of sound *) |
| Comparative Example 1-9  | —  | —  | —  | —  | 0  | —  | 33.6 | 0.23 | ○ |
| Comparative Example 1-10 | —  | —  | —  | —  | 0  | 20 | 1.03 | 0.53 | x |
| Comparative Example 1-11 | 70 | 0  | 0  | 0  | 70 | —  | —    | powder dropped | — |
| Comparative Example 1-12 | 60 | 0  | 0  | 0  | 60 | —  | 8.9  | 0.23 | ○ |
| Comparative Example 1-13 | 3  | 0  | 0  | 0  | 3  | —  | 28.8 | 0.23 | ○ |
| Comparative Example 1-14 | 50 | 8  | 8  | 8  | 74 | —  | —    | powder dropped | — |
| Comparative Example 1-15 | 40 | 30 | 0  | 0  | 70 | —  | —    | powder dropped | — |
| Comparative Example 1-16 | 40 | 0  | 30 | 0  | 70 | —  | —    | powder dropped | — |
| Comparative Example 1-17 | 40 | 0  | 0  | 30 | 70 | —  | —    | powder dropped | — |
| Comparative Example 1-18 | 30 | 10 | 10 | 10 | 60 | 20 | 0.96 | 0.48 | x |

*) ○ . . . sound generated
x . . . no sound generated

As shown in Table 2, it was confirmed that the paints obtained in Examples generated no sound, and the width of the coefficient of kinetic friction thereof was small, compatible to that in the case of the unwoven fabric used currently against the friction sound, and that the paints in Examples exhibited the friction sound-preventing effect.

To the contrary, the paints obtained in Comparative Examples 1–9 and 12 were effective against the friction sound, but their commercial value are inferior because they did not afford the flatting effect. In Comparative Examples 1–10 and 1–18, the flatting effect was imparted, but the width of the coefficient of kinetic friction was large to generate friction sound. In Comparative Example 13, the flatting degree is small.

The friction sound-preventing surface-treating agent according to the present invention is obtained by adding 2–60 wt. % of the spherical and/or non-spherical polyurethane particles having the average particle diameter of 1–50 μm to the acry-vinyl chloride based paint resin, and the invention surface-treating agent can effectively prevent the friction sound to be generated through contact between the opponent parts when it is applied to the parts.

Further, since the surface-treating agent according to the present invention can be applied to the entire surface of the uncoated original sheet during the surface-treating step currently employed, neither the introduction of an additional step nor the unwoven fabric-sticking step are unnecessary, making the working steps more simple. Furthermore, the surface-treating agent of the present invention can be applied to the portions which a person can well see, for example, door trims, a contact portion between an instrument panel and a door trim or seat sides. In addition, the characteristic that the acryl-vinyl chloride based paint resin exhibits more excellent effect against the single sound as compared with the polyurethane resin is maintained even when the polyurethane beads are incorporated into the acryl-vinyl chloride based paint resin.

In the following, the colored paint resins were examined.

Example 2–1

To 100 wt. % of an acryl-vinyl chloride based paint resin (acryl portion 53 wt. %, vinyl chloride portion 47 wt. %) were added 40 wt. % of polyurethane particles (the average particle diameter of 15 μm, really spherical), 3 wt. % of a high molecular weight polyethylene wax (number average molecular weight 10000, average particle diameter 15 μm, spherical) and 30 wt. % of a mixed pigment (titanium oxide, ion oxide and carbon). The pigment was preliminarily dispersed by a "DYNO-MILL®" manufactured by WILLY A. Bachohen AG, Maschinenfabric Basel, Switzerland. The resulting mixture was stirred. Next, the mixture was fully mixed and dispersed in a sand grinding mill, and diluted at 100:200 with a mixed diluting agent composed of toluene, xylene and MEX. The diluted mixture was sprayed onto the surface of a surface skin made of polyvinyl chloride, which was dried, thereby a sample in Example 2–1.

Example 2–2

To 100 wt. % of the pain: resin used in Example 2–1 were added 25 wt. % of polyurethane particles (average particle diameter 15 μm, really spherical), 3 wt. % of a high molecular weight polyethylene wax (number average molecular weight 10000, average particle diameter 15 μm, spherical), 30 wt. % of the pigment in Example 2–1, and 11 wt. % of silica particles (average particle diameter 3 μm, non-spherical). In the same manner as in Example 2–1, the mixture was treated, and a sample in Example 2–2 was obtained.

Example 2–3

To 100 wt. % of the paint resin used in Example 2–1 were added, as a solid component, 30 wt. % of polyurethane particles A (average particle diameter 15 μm, really spherical), 30 wt. % of polyurethane particles B (average particle diameter 5 μm, really spherical), 4 wt. % of a high molecular weight polyethylene wax (number average molecular weight 10000, average particle diameter 15 μm, spherical), and 30 wt. % of the pigment in Example 2–1. In the same manner as in Example 2–1, the mixture was treated, and a sample in Example 2–3 was obtained.

Example 2–4

To 100 wt. % of the paint resin used in Example 2–1 were added, as a solid component, 30 wt. % of polyurethane particles A (average particle diameter 15 μm, really spherical), 30 wt. % of polyurethane particles B (average particle diameter 5 μm, really spherical), 3 wt. % of a high molecular weight polyethylene wax (number average molecular weight 10000, average particle diameter 15 μm, spherical), 30 wt. % of the pigment in Example 2–1, and 7 wt. % of dispersed silica particles (average particle diameter 3 μm, amorphous). In the same manner as in Example 2–1, the mixture was treated, and a sample in Example 2–4 was obtained.

Comparative Example 2–1

A sample in Comparative Example 2–1 was obtained in the same manner as in Example 2–1 except that a polyethylene wax A (average particle diameter 8 μm, non-spherical, number average molecular weight 2000) was used instead of the polyethylene wax.

Comparative Example 2–2

A sample in Comparative Example 2–2 was obtained in the same manner as in Example 2–1 except that a polyethylene wax B (number average particle diameter 14 μm, spherical, average molecular weight 2000) was used instead of the polyethylene wax.

Comparative Example 2–3

A sample in Comparative Example 2–3 was obtained in the same manner as in Example 2–1 except that polypropylene wax particles (number average particle diameter 6 μm, spherical) was used instead of the polyethylene wax.

Comparative Example 2–4

A sample in Comparative Example 2–4 was obtained in the same manner as in Example 2–1 except that nylon particles (maximum particle diameter 34 μm, non-spherical) was used instead of the polyethylene wax.

Comparative Example 2–5

A sample in Comparative Example 2–5 was obtained in the same manner as in Example 2–1 except that nylon particles (maximum particle diameter 44 μm, non-spherical) was used instead of the polyethylene wax.

Comparative Example 2–6

A sample in Comparative Example 2–6 was obtained in the same manner as in Example 2–1 except that no polyethylene wax (no color migration-preventing agent) was added.

Comparative Example 2–7

A sample in Comparative Example 2–7 was obtained in the same manner as in Example 2–1 except that an acryl-vinyl chloride paint (acryl portion 20 wt. %, vinyl portion 80 wt. %) was used as the paint, and the polyethylene wax A was added as in Comparative Example 2–1.

Comparative Example 2–8

A sample in Comparative Example 2–8 was obtained in the same manner as in Example 2–1 except that an acryl-vinyl chloride paint (acryl portion 75 wt. %, vinyl portion 25 wt. %) was used as the paint, and the polyethylene wax A was added as in Comparative Example 2–1.

Test Experiment

Each of the surface-treating agents obtained in Examples 2–1 to 2–4 and Comparative Examples 2–1 to 2–7 was airlessly sprayed upon the surface of a current PVC sheet not surface-treated, and the resulting paint film was cured, thereby obtaining test sheets.

With respect to Comparative Example 2–8, the paint film was cracked upon coating, and the paint was not practically applicable.

With respect to Examples 2–1 to 2–4 and Comparative Examples 2–1 to 2–7, the dying resistance (color migration degree) was evaluated according to JIS (Japan Industrial Standard) L 0801 (Color fastness test method).

Further, with respect to sheets upon which each of the samples in Examples 2–1 to 2–4 was coated, a friction test was effected in a reciprocating manner by using an ordinary PVC sheet for an automobile interior purpose as an opponent member. Based on this, the friction performance was evaluated and generation of the friction sound was confirmed.

Results are shown in Table 3.

TABLE 3(a)

|  | Composition of resin paint wt % | Particles added for preventing friction sound | | | | Width of kinetic coefficient of friction | Sound generation |
|---|---|---|---|---|---|---|---|
|  |  | Kind | Shape | Average particle diameter | Added amount *1 (wt %) |  |  |
| Example 2-1 | acryl 53 vinyl chloride 47 | Urethane | Spherical | 15 μm | 40 | 0.25 | not generated ○ |
| Example 2-2 | acryl 53 vinyl chloride 47 | Urethane Silica | Spherical Non-spherical | 15 μm 3 μm | 25 11 | 0.23 | not generated ○ |
| Example 2-3 | acryl 53 vinyl chloride 47 | Urethane A Urethane B | Spherical Spherical | 15 μm 5 μm | 30 30 | 0.22 | not generated ○ |
| Example 2-4 | acryl 53 vinyl chloride 47 | Urethane A Urethane B Silica | Spherical Spherical Non-spherical | 15 μm 5 μm 3~4 μm | 30 30 7 | 0.33 | not generated ○ |
| Comparative Example 2-1 | acryl 53 vinyl chloride 47 | Urethane | Spherical | 15 μm | 40 | 0.26 | not generated ○ |
| Comparative Example 2-2 | acryl 53 vinyl chloride 47 | Urethane | Spherical | 15 μm | 40 | 0.25 | not generated ○ |
| Comparative Example 2-3 | acryl 53 vinyl chloride 47 | Urethane | Spherical | 15 μm | 40 | 0.28 | not generated ○ |
| Comparative Example 2-4 | acryl 53 vinyl chloride 47 | Urethane | Spherical | 15 μm | 40 | 0.27 | not generated ○ |
| Comparative Example 2-5 | acryl 53 vinyl chloride 47 | Urethane | Spherical | 15 μm | 40 | 0.26 | not generated ○ |
| Comparative Example 2-6 | acryl 53 vinyl chloride 47 | Urethane | Spherical | 15 μm | 40 | 0.26 | not generated ○ |
| Comparative Example 2-7 | acryl 20 vinyl chloride 80 | Urethane | Spherical | 15 μm | 40 | 0.26 | not generated ○ |
| Comparative Example 2-8 | acryl 75 vinyl chloride 25 | Urethane | Spherical | 15 μm | 40 | 0.26 | not generated ○ |

*1 Amount relative to 100 wt % of resin

TABLE 3(b)

|  | Particles added for preventing color migration *2 | | | | Color fading *3 (grade) |
|---|---|---|---|---|---|
|  | kind | shape | Average particle diameter | added amount (wt %) |  |
| Example 2-1 | PE-WAX high molecular weight | Spherical | 15 μm | 3 | 4.0 |
| Example 2-2 | PE-WAX high molecular weight | Spherical | 15 μm | 3 | 4.0 |
| Example 2-3 | PE-WAX high molecular weight | Spherical | 15 μm | 3 | 4.0 |
| Example 2-4 | PE-WAX high molecular weight | Spherical | 15 μm | 3 | 4.0 |
| Comparative Example 2-1 | PE-WAX low molecular weight | Non-spherical | 5~10 μm | 3 | 3.5~4.0 |
| Comparative Example 2-2 | PE-WAX | Spherical | 14 μm | 3 | 3.5~4.0 |
| Comparative Example 2-3 | PP-WAX | Spherical | 6 μm | 3 | 2.0 |
| Comparative Example 2-4 | Nylon | Non-spherical | 34 μm | 3 | 2.0 |
| Comparative Example 2-5 | Nylon | Spherical | 44 μm | 3 | 2.0 |
| Comparative Example 2-6 | not added | — | — | 3 | 2.0 |
| Comparative Example 2-7 | PE-WAX low molecular weight | Non-spherical | 5~10 μm | 3 | 2.0 |

TABLE 3(b)-continued

| | | Particles added for preventing color migration *2 | | | |
|---|---|---|---|---|---|
| | kind | shape | Average particle diameter | added amount (wt %) | Color fading *3 (grade) |
| Comparative Example 2-8 | PE-WAX low molecular weight | Non-spherical | 5~10 μm | 3 | |

*2 Added amount relative to 100 wt % of resin
*3 Color fading: 1.0 (great color fading) to 5.0 (no color fading observed)

As shown in Table 3, the paints obtained in Examples 2–1 to 2–4 all exhibited the 4th grade in the color fading, and their color migration degrees were levels causing practically no problem. In addition, the friction tests of Examples 2–1 to 2–4 confirmed that the friction sound-preventing performance caused no problem.

To the contrary, with respect to Comparative Examples 2–1 to 2–6, particularly Comparative Examples 2–3 to 2–6, into which the particles other than the specific polyethylene wax were added, it was confirmed that the color migration was conspicuous, and they were practically improper. Further, the paint resins having different compositions exhibited no color migration-preventing effect.

According to the friction sound-preventing surface-treating agent, the friction sound due to contacting between parts can be prevented by using the acryl-vinyl chloride colored paint resin containing 40–60 wt. % of the acryl portion as said acryl-vinyl chloride paint resin, and incorporating 2–60 wt. % of spherical or non-spherical particles of the polyurethane having the average particle diameter of 1–50 μm as a solid component.

Further, the color migration due to friction or abrasion can be prevented by incorporating spherical particles of a polyethylene wax having the number average molecular weight of 4000 to 20000 in an amount of 2 to 6 wt. % as a soled component relative to 100 wt. % of the acryl-vinyl chloride colored paint resin of the friction sound-preventing surface-treating agent.

Furthermore, since the friction sound-preventing surface-treating agent can be applied, in the form of a single colored paint layer, to the entire surface of the uncoated original sheet during the surface treating step currently employed, neither a new additional step needs be introduced nor an unwoven fabric needs be bonded. In addition, since a single layer of the colored paint has only to be employed, a step for the formation of a clear coat can be omitted so that the working process can be largely simplified and the cost can be largely reduced. Further, the surface-treating agent of the present invention can be applied to the portions which a person can well see, for example, door trims, a contact portion between an instrument panel and a door trim, and side portions of seats.

What is claimed is:

1. A friction sound-preventing surface-treating agent comprising an acryl-vinyl chloride based paint resin, and 2–60 wt. % of spherical and/or non-spherical polyurethane particles having an average particle diameter of 1–50 μm as a solid component, based on the weight of said acryl-vinyl chloride based paint resin.

2. A friction sound-preventing surface-treating agent comprising an acryl-vinyl chloride based paint resin, (a) 5–60 wt. % of spherical polyurethane particles having an average particle diameter of 5–50 μm, and (b) 1–50 wt. % of resinous and/or rubbery fine particles having an average particle diameter of 1–8 μm, said (a) and (b) being totally contained in an amount of 5–70 wt. % as a solid component, wherein all percentages are based on the weight of said acryl-vinyl chloride resin.

3. A friction sound-preventing surface-treating agent comprising an acryl-vinyl chloride based paint resin, (c) 1–50 wt. % of said spherical and/or non-spherical polyurethane particles having the average particle diameter of 1–8 μm as the solid component, and (d) 1–40 wt. % of the spherical and/or non-spherical polyurethane particles having the average particle diameter of 5–50 μm as a solid component, said (c) and (d) being contained in a total amount of 2–60 wt. %, wherein all percentages are based on the weight of said acryl-vinyl chloride resin.

4. The friction sound-preventing surface-treating agent claimed in claim 1, wherein silica particles having an average particle diameter of 1–8 μm are contained as a flatting agent in an amount of 1–15 wt. % based on the weight of said acryl-vinyl chloride based paint resin.

5. The friction sound-preventing surface-treating agent claimed in claim 2, wherein said (b) component is at leat one selected from the group consisting of flaky fluoride resin particles, amorphous NBR rubber particles and amorphbous SBR rubber particles.

6. The friction sound-preventing surface-treating agent claimed in claim 2, wherein silica particles having an average particle diameter of 1–8 μm are contained as a flattening agent in an amount of 1–15 wt. % based on the weight of said acryl-vinyl chloride based paint resin.

7. The friction sound-preventing surface-treating agent claimed in claim 3, wherein silica particles having an average particle diameter of 1–8 μm are contained as a flattening agent in an amount of 1–15 wt % based on the weight of said acryl-vinyl chloride based paint resin.

8. A friction sound-preventing surface-treating agent comprising an acryl-vinyl chloride based colored paint resin, spherical polyurethane particles added as a solid component and having an average particle diameter of 1 to 50 μm, and a polyethylene wax added as a solid component and having a weight average molecular weight of 4000 to 20000, wherein said aryl-vinyl chloride based colored paint resin contains 40 to 60 wt. % of an acrylic polymer, and said spherical polyurethane particles and the polyethylene wax are in an amount of 2 to 70 wt. % and in an amount of 2 to 6 wt. %, respectively, relative to 100% by weight of the acryl-vinyl chloride based colored paint resin.

9. A friction sound-preventing surface-treating agent according to claim 8, further comprising 1 to 15 wt. % of silica particles having an average particle diameter of 1 to 8 μm as a delustering agent in an amount of 1 to 15 wt. % relative to 100 wt. % of the acryl-vinyl chloride based colored paint resin.

10. A friction sound-preventing surface-treating agent according to claim 8, wherein said polyurethane particles comprise 1 to 50 wt. % of first spherical polyurethane particles having an average particle diameter of 1 to 8 µm and 1 to 40 wt. % of second spherical polyurethane particles having an average particle diameter of 5–50 µm, the average particle diameter of the first polyurethane particles differs from that of the second polyurethane particles by not less than 4 µm.

* * * * *